(12) United States Patent
Dittmar et al.

(10) Patent No.: US 8,632,255 B2
(45) Date of Patent: Jan. 21, 2014

(54) BEARING ASSEMBLY

(75) Inventors: Rico Dittmar, Schweinfurt (DE); Thilo Louis Beck, Werneck (DE); Gerhard Haas, Dittelbrunn (DE); Michael Kummert, Höchberg (DE); Achim Müller, Dittelbrunn (DE); Bernd Stephan, Schweinfurt (DE); Arno M. Stubenrauch, Aidhausen (DE); Peter Volpert, Bergrheinfeld (DE); Thomas Will, Poppenhausen (DE)

(73) Assignee: Aktiebolaget SKF, Göteborg (SE)

( * ) Notice: Subject to any disclaimer, the term of this patent is extended or adjusted under 35 U.S.C. 154(b) by 330 days.

(21) Appl. No.: 12/817,056

(22) Filed: Jun. 16, 2010

(65) Prior Publication Data

US 2011/0033147 A1 Feb. 10, 2011

(30) Foreign Application Priority Data

Jun. 16, 2009 (DE) .......................... 10 2009 024 088

(51) Int. Cl.
*F16C 23/10* (2006.01)
*F16C 19/40* (2006.01)
*F16C 27/04* (2006.01)

(52) U.S. Cl.
USPC ............................ 384/563; 384/551; 384/582

(58) Field of Classification Search
USPC ................ 384/548, 551, 563, 585, 581, 582; 156/293, 294, 325
See application file for complete search history.

(56) References Cited

U.S. PATENT DOCUMENTS

| | | | |
|---|---|---|---|
| 5,757,084 A * | 5/1998 | Wagner | 301/105.1 |
| 5,875,550 A | 3/1999 | Kohn | |
| 6,315,457 B1 * | 11/2001 | Kapaan et al. | 384/544 |
| 6,786,645 B2 * | 9/2004 | Joki et al. | 384/488 |
| 7,121,728 B2 | 10/2006 | Pete et al. | |
| 7,220,059 B2 | 5/2007 | Gobel et al. | |
| 2002/0181819 A1 * | 12/2002 | Muraki et al. | 384/538 |
| 2003/0094849 A1 | 5/2003 | Joki et al. | |
| 2004/0076356 A1 | 4/2004 | Kapaan et al. | |
| 2010/0150488 A1 * | 6/2010 | Beck et al. | 384/537 |

FOREIGN PATENT DOCUMENTS

| | | |
|---|---|---|
| DE | 60106262 T2 | 9/2005 |
| DE | 102004018188 A1 | 11/2005 |
| EP | 0450081 A1 | 10/1991 |

\* cited by examiner

*Primary Examiner* — Thomas R Hannon
*Assistant Examiner* — Yamilka Pinero Medina
(74) *Attorney, Agent, or Firm* — Bryan Peckjian; SKF USA Inc. Patent Department

(57) ABSTRACT

A bearing assembly includes a first bearing comprising a first inner ring and a second bearing comprising a second inner ring. A sleeve-shaped spacer is disposed between and axially separates the first and second inner rings. An adhesive connects the spacer to the first and second inner rings.

24 Claims, 1 Drawing Sheet

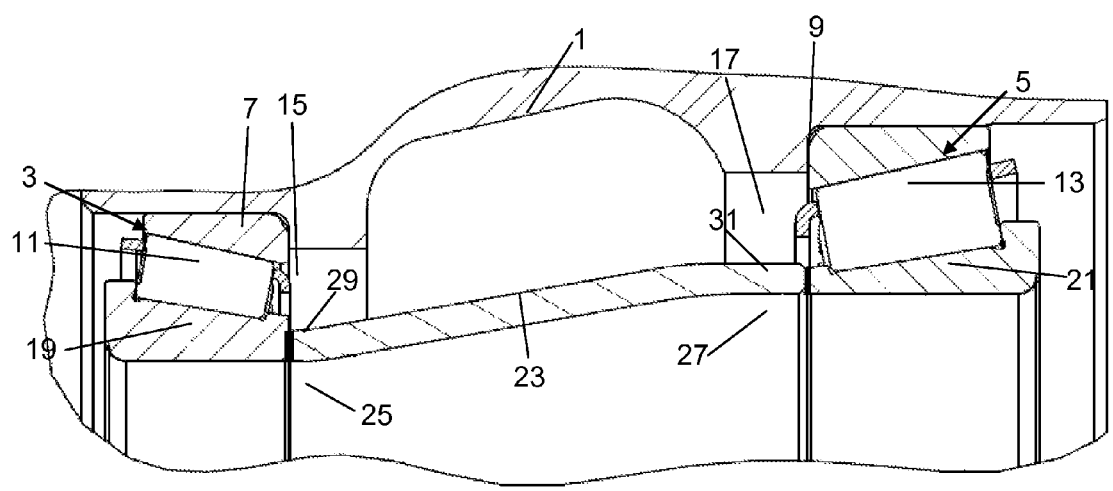

BEARING ASSEMBLY

CROSS-REFERENCE

This application claims priority to German patent application no. 10 2009 024 988.5, filed on Jun. 16, 2009, which is incorporated fully herein by reference.

TECHNICAL FIELD

The present invention generally relates to bearings and bearing assemblies, which may preferably be utilized in wheel bearings, e.g., truck wheel bearings, in certain applications of the present teachings.

BACKGROUND ART

Some known bearing assemblies for wheel bearings utilized in trucks comprise two inner rings or races having different bore diameters. A frustum-shaped connecting piece or spacer is disposed between the differently-sized inner rings and serves to set the spacing of the inner rings in the axial direction. The inner rings and spacer are mounted on a non-driven wheel axle or axle spindle having an outer shape that generally corresponds to the shape of the inner bores of the inner rings and spacer. Roller elements are disposed between the inner rings, which contact the axle spindle and do not rotate during driving, and a corresponding set of outer rings or races, thereby forming inboard and outboard roller bearings. These roller bearings enable a wheel hub coupled to a wheel to rotate about the non-driven axle spindle when the vehicle is driven.

To simplify mounting of the wheel mount on the wheel axle, the inner ring having the smaller diameter is disposed, with respect to the insertion direction of the wheel axle, on the forward or front side of the wheel mount and the inner ring having the larger diameter is disposed on the rearward side of the wheel mount. The circumferences of the wheel axle or axle spindle correspond to the bore diameters of the inner rings and the spacer, such that, during mounting of the wheel mount on the wheel axle, the segment of smaller circumference is initially guided through the larger-diameter inner ring and the spacer. This mounting procedure can thus be performed in a relatively simple manner. As soon as the axle spindle segment having the smaller circumference is completely inserted into the inner ring having the smaller diameter, the frustum-shaped segment of the axle spindle is located in the corresponding frustum-shaped segment of the spacer and the segment of the axle spindle having the larger circumference is located in the inner ring of larger diameter.

In such a three-part construction, axial and/or radial shifting or displacement of the inner rings relative to the spacer may not be sufficiently restricted or prevented during the mounting procedure. Further, if the junction of the respective inner rings and the spacer is not relatively smooth, the axle spindle could bump against the spacer or the smaller inner ring during insertion into the wheel bearing assembly, which would hinder the mounting procedure.

SUMMARY

It is an object of the present invention to provide an improved bearing and/or bearing assembly.

According to a first aspect of the present teachings, a bearing assembly preferably comprises at least two bearings separated or spaced in the axial direction of the bearing assembly or a shaft supporting the bearing assembly. The bearings each preferably comprise at least one inner ring and these two inner rings may have the same-sized bore diameter or differently-sized bore diameters. A structure configured to axially space or separate the inner rings (hereinafter, a "spacer") and having a hollow (e.g., sleeve-like) interior is preferred, which hollow structure may be at least substantially cylindrical, frustum-like, conical or tapered shape. The inner diameter at each axial end region of the spacer preferably corresponds to the respective bore diameter of the bordering or adjacent inner ring, so that at least one contact point is defined between the spacer and each respective inner ring.

The spacer is adhesively connected with each inner ring at least one contact point. Due to the adhesive connection of the spacer with each of the inner rings, the spacer is prevented from shifting in the radial direction, which preferably alleviates problems associated with the mounting of known bearing assemblies onto a shaft or axle.

Preferably, the inner bores of the inner rings and the spacer are configured to receive an axle spindle of a wheel axle.

In preferred embodiments, the inner rings are differently sized so as to at least substantially match different inner bore diameters of the respective axial ends of the spacer, which is a tapered spacer in such embodiments. More preferably, the inner bores of the bearing assembly at each junction of inner ring and spacer are flush or substantially flush so that no protrusion extends into the bore space. In this tapered spacer embodiment, the inner bore diameters preferably smoothly transition or change from a larger diameter to a smaller diameter. The transition or change of bore diameters may be continuous or discontinuous.

The spacer is preferably embodied as one integral piece in order to avoid the necessity of providing one or more additional retaining elements for securing the spacer. However, multiple piece spacers are also within the scope of the present teachings.

As indicated above, the inner rings and the spacer are preferably arranged relative to each other so that the inner bores smoothly transition at each junction between an inner ring and the spacer. In preferred wheel bearing assembly embodiments, this design feature enables the axle or axle spindle to be inserted as simply and smoothly as possible. That is, there is preferably no elevation or unevenness at the junctions at least in the insertion direction of the axle, so that the axle spindle does not bump or get caught on any internal structure during the wheel axle mounting procedure.

In another aspect of the present teachings, the contact points and/or the contact surfaces defined at the junction of the spacer and each inner ring may preferably have a roughness of at least about 0.4 μm. In addition or in the alternative, the contact points or surfaces may preferably have a roughness of equal to or less than about 3 μm. The particularly preferred roughness range of about 0.4 to 3 μm is optimal for strong adhesive connections. However, other roughness values may be suitable depending upon the particular application and the adhesive that is utilized.

The adhesive may be, e.g., an acrylic adhesive, which is simple to handle and provides a high adhesive strength for metals. In addition or in the alternative, the adhesive may be, e.g., an anaerobic adhesive, for which hardening initiates in the presence of metal ions and in the absence of oxygen. This results in a high adhesive strength, so that a reliable securing of the spacer is possible.

An activator optionally may be utilized for activating the hardening or curing of the adhesive. Such an optional embodiment may be appropriate, for example, when a type of metal is used, e.g., in a roller bearing, which does not present sufficient metal ions on the metal surface for initiating the hardening or curing of the anaerobic adhesive.

A particularly preferred adhesive is urethane methacrylate ester.

The term 'spacer' may also be replaced or substituted with the term 'spacer sleeve', 'sleeve', 'journal', 'connecting piece', etc. The spacer serves, in part, to define an axial separation or spacing between two inner rings and to provide a hollow cavity for receiving, e.g., an axle or other type of shaft.

The terms 'inner ring' and 'outer ring' may also be replaced or substituted with the terms 'inner race' and 'outer race', respectively.

In accordance with another aspect of the present teachings, one or more of the bearings is embodied as a roller bearing and preferably includes one or more roller bearing elements or bodies, which is/are preferably disposed between the inner ring of the bearing and an outer ring or race of the bearing. The roller bodies may be spherical, cylindrical, tapered, etc. The shape of the roller bodies is not particularly limited according to the present teachings.

In addition or in the alternative, a bearing assembly according to the present teachings may be a component of a wheel bearing, e.g., for usage in truck applications.

In another aspect of the present teachings, a bearing assembly includes a first bearing comprising a first inner ring and a second bearing comprising a second inner ring. A sleeve-shaped spacer is disposed between and axially separates the first and second inner rings. The spacer is affixed to the first and second inner rings, respectively, via an adhesive. Each of the first and second bearings may further comprise an outer ring and a plurality of roller bodies is preferably disposed between the respective inner and outer rings. Cages may be disposed around the respective roller bodies, as is well known in the art.

Further advantages and embodiments of the invention are derivable from the following description of exemplary embodiments together with the appended drawing and claims.

BRIEF DESCRIPTION OF THE DRAWING

FIG. 1 shows a preferred exemplary embodiment of the invention in schematic radial cross section.

DETAILED DESCRIPTION OF THE PREFERRED EMBODIMENTS

Each of the additional features and teachings disclosed below may be utilized separately or in conjunction with other features and teachings to provide improved bearings and/or bearing assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

A representative bearing assembly, which is preferably utilized as a wheel bearing, is illustrated in radial cross section in FIG. 1. Only components relevant for the description of the exemplary embodiment are depicted and described in the following. Other features may be utilized according to the known art and thus need not be explicitly described herein.

The representative wheel bearing comprises a support unit or wheel hub 1 for affixing a wheel rim on the wheel bearing. Two roller bearings 3 and 5 function to rotatably support the support unit 1 on a wheel axle or axle spindle, which is not depicted here. The roller bearings 3 and 5 each have an outer ring 7 and 9, respectively, one or more roller bodies 11 and 13, respectively, a cage 15 and 17, respectively, and an inner ring 19 and 21, respectively. Although a single roller body 11, 13 is depicted in the drawing for each roller bearing, a plurality of roller bodies are preferably used in preferred embodiments. The inner rings 19 and 21 preferably have differently-sized bore diameters, wherein the smaller inner ring 19 is disposed forward of the larger inner ring 21 with reference to the insertion direction of the wheel axle. That is, the wheel axle insertion direction is from right to left according to the illustration of FIG. 1.

The roller bearings 3 and 5 are arranged so as to be spaced in the axial direction. A spacer sleeve 23 (hereinafter simply "spacer 23") is disposed between the roller bearings 3 and 5. The spacer 23 preferably contacts the inner rings 19 and 21 and thus determines the axial spacing between the roller bearings 3 and 5.

The spacer 23 is preferably sleeve-shaped, i.e. hollow, so that a shaft or wheel axle can extend through it. In further preferred embodiments, the spacer 23 may be substantially frustum-or conical-shaped, e.g., it may be tapered, such that the bore diameter of the spacer 23 decreases along the axial direction of the spacer 23. The inner and/or outer diameters of the spacer 23 may decrease in a continuous manner, a discontinuous manner or a combination of the two. However, in embodiments in which the inner rings 19 and 21 have identical or substantially identical sizes and/or bore diameters, the spacer 23 may preferably be cylinder-shaped or substantially cylinder-shaped. In addition, the spacer 23 has a substantially constant wall thickness from its first annular end surface to its second annular end surface.

At the circumferentially-extending contact points 25 and 27, the bore diameters of the spacer 23 at each axial end substantially match the bore diameter of the bordering or adjacent inner ring 19 or 21, respectively. In certain applications of the present teachings, the bore diameters of the inner rings 19, 21 can be slightly smaller or larger than the adjacent diameters of the spacer 23. In such a design, the component having the smaller bore diameter should preferably be disposed further forward with reference to the insertion direction of the wheel axle. In this case, no protrusions will result within the bore that would hinder the insertion of the wheel axle due to hitting or bumping against the protrusions. The spacer 23 may also optionally include segments having a constant bore diameter near each contact point 25 and 27.

Each axial side of the spacer 23 has at least one contact surface 29 and 31, respectively, at the respective contact points 25 and 27, respectively. The same applies to the inner rings 19 and 21, respectively. The respective contact surfaces preferably extend continuously in the circumferential direction of the spacer 23 and the inner rings 19, 21, although the contact surfaces may also extend discontinuously.

An adhesive connects the contact surfaces 29 and 31 of the spacer 23 with the contact surfaces of the inner rings 19 and 21, respectively. This adhesion results in the position of the spacer 23 being fixed at least in the radial direction. Consequently, the spacer 23 is retained in the illustrated position, so that the wheel axle is insertable without problems.

The contact surfaces 29 and 31 preferably have a roughness between about 0.4 and 3 µm for optimization of the adhesion. In such an embodiment, a particularly stable connection of the inner rings 19 and 21, respectively, with the spacer 23 can be achieved.

As representative non-limiting examples, an acrylic adhesive and/or an anaerobic adhesive can be used as the adhesive. A stable connection of the metallic components can be provided with both types. A preferred adhesive is urethane methacrylate ester.

Furthermore, in embodiments using preferred adhesives, it is not required that the contact surfaces 29 and 31, respectively, are completely dry and grease-free in order for the adhesive to achieve a sufficient holding force. The contact surfaces 29 and 31, respectively, can also be slightly oily. In particular, the anaerobically-hardening adhesives harden or cure in the presence of metal ions and in the absence of oxygen. Metal ions come, for example, from the metallic contact surfaces. However, one or more activators can be used in order to accelerate and/or initiate the hardening or curing process, if necessary, such as e.g., a copper salt or aliphatic amine.

When mounting the wheel bearing, the adhesive may be first applied, e.g., in serpentine manner onto the contact surfaces, for example using a sprayer. The components are then disposed in the appropriate axial positions and are fixed by applying a sufficiently strong clamping force in the axial direction while the adhesive hardens or cures. The hardening/curing process can be accelerated for example by activators, as mentioned above, and/or by the application of a heat treatment. In certain embodiments, the adhesive hardening time may be so short that a very high manufacturing throughput can be realized.

In order to produce a junction that is as uniform and stable as possible between an obliquely-extending (tapered), the axial end sections of the spacer 23 may preferably include an axially-extending section having a constant outer diameter that is disposed adjacent to each of the contact surfaces 29 and 31, respectively.

For mounting of the wheel bearing assembly, it is advantageous if the inner rings 19 and 21 remain fixed or immovable relative to the spacer 23 in the axial direction, preferably with a compressive force being applied in the axial direction.

As indicated above, the present teachings are not limited to embodiments, in which the two inner rings have different bore sizes and the spacer is tapered. Suitable spacers can also be utilized in bearing assemblies, in which the inner rings have the same inner diameter. In this case, the spacer is not embodied as frustum-shaped, but rather as cylinder-shaped having an inner diameter that at least substantially matches the bore diameter(s) of the inner rings.

REFERENCE NUMBER LIST 1 support unit
3, 5 roller bearing
7, 9 outer ring
11, 13 roller body
15, 17 cage
19, 21 inner ring
23 spacer
25, 27 contact point
29, 31 contact surface

The invention claimed is:

1. A bearing assembly comprising:
a first bearing comprising a first inner ring,
a second bearing comprising a second inner ring and
a sleeve-shaped spacer disposed between and axially separating the first and second inner rings, wherein the spacer is adhesively connected to the first and second inner rings at at least one contact point defined on adjacent axial contact surfaces of the spacer and the respective inner rings,
wherein a first bore diameter of the spacer at a first axial end of the spacer is substantially the same as a bore diameter of the first inner ring and wherein a second bore diameter of the spacer at a second axial end of the spacer is substantially the same as a bore diameter of the second inner ring.

2. A bearing assembly according to claim 1, wherein the first and second inner rings have differently-sized bore diameters and the sleeve-shaped spacer has one of a substantially frustum shape, a substantially conical shape and a tapered shape, and wherein the inner surfaces of the spacer and the first and second inner rings join in a flush manner.

3. A bearing assembly according to claim 2, wherein the contact surfaces have a roughness of at least about 0.4 µm.

4. A bearing assembly according to claim 3, wherein at least contact points of the contact surfaces have a roughness of equal to or less than about 3 µm.

5. A bearing assembly according to claim 4, wherein at least the contact points of the contact surfaces are connected by an acrylic adhesive.

6. A bearing assembly according to claim 4, wherein the contact points are connected by an anaerobic adhesive.

7. A bearing assembly according to claim 6, wherein the anaerobic adhesive comprises an activator.

8. A bearing assembly according to claim 7, wherein the activator includes at least one of a copper salt and an aliphatic amine.

9. A bearing assembly according to claim 8, wherein the contact points are connected by urethane methacrylate ester.

10. A bearing assembly according to claim 9, further comprising at least one roller bearing element supported by the first inner ring and at least one roller bearing element supported by the second inner ring.

11. A bearing assembly according to claim 10, further comprising a wheel hub rotatably supported by the roller bearing elements, wherein the bores of the first inner ring, the second inner ring and the spacer are configured to receive a tapered wheel axle.

12. A bearing assembly according to claim 11, wherein the spacer includes a first axially-extending section having a first constant outer diameter disposed adjacent to a first axial end and a second axially-extending section having a second constant outer diameter disposed adjacent to a second axial end, the second constant outer diameter being different than the first constant outer diameter.

13. A bearing assembly according to claim 1, wherein the contact surfaces have a roughness of between about 0.4 μm and about 3 μm.

14. A bearing assembly according to claim 13, wherein the contact points are connected by urethane methacrylate ester.

15. A bearing assembly according to claim 1, wherein the contact points are connected by urethane methacrylate ester.

16. The bearing assembly according to claim 1, wherein the contact surfaces of the spacer and the contact surfaces of the inner rings extend discontinuously.

17. A bearing assembly comprising:
 a first bearing comprising a first inner race having a first inner bore diameter,
 a second bearing comprising a second inner race having a second inner bore diameter different from the first inner bore diameter, and
 a tapered spacer disposed between and axially separating the first and second inner races, the spacer being connected to the first and second inner races via an adhesive at adjacent axial contact surfaces,
 wherein a first bore diameter of the spacer at a first axial end of the spacer is substantially the same as the first inner bore diameter and wherein a second bore diameter of the spacer at a second axial end of the spacer is substantially the same as the second inner bore diameter.

18. A bearing assembly according to claim 17, wherein contact surfaces defined on adjacent axial surfaces of the spacer and the first and second inner races, respectively, have a roughness of between about 0.4 μm and about 3 μm and the adhesive comprises at least one of an acrylic adhesive and an anaerobic adhesive.

19. A bearing assembly according to claim 18, wherein the adhesive comprises urethane methacrylate ester.

20. A bearing assembly according to claim 19, further comprising:
 at least one roller bearing element supported by the first inner race,
 at least one roller bearing element supported by the second inner race and
 a wheel hub rotatably supported by the roller bearing elements, wherein the bores of the first inner race, the second inner race and the spacer are configured to receive a tapered wheel axle spindle.

21. A bearing assembly according to claim 20, wherein the spacer has a substantially frustum shape, and wherein the inner bore surface of the first inner race is flush with the first inner bore diameter surface of the spacer and the inner bore surface of the second inner race is flush with the second inner bore diameter surface of the spacer.

22. A bearing assembly comprising:
 a first bearing comprising a first inner ring having an annular end face and an inner bore having a first diameter;
 a second bearing comprising a second inner ring having an annular end face and an inner bore having a second diameter different than the first diameter; and
 a sleeve-shaped spacer, at least part of the spacer being of frustum shape, having a first annular end surface adhesively connected to the annular end face of the first inner ring and a second annular end surface adhesively connected to the annular end face of the second inner ring.

23. A bearing assembly according to claim 22, wherein the sleeve-shaped spacer has a first inner diameter at the first annular end surface substantially the same as the first diameter of the first inner ring and a second inner diameter at the second annular end surface substantially the same as the second diameter of the second inner ring.

24. A bearing assembly according to claim 23, wherein the sleeve-shaped spacer has a substantially constant wall thickness from the first annular end surface to the second annular end surface.

* * * * *